(12) United States Patent
Lai

(10) Patent No.: US 8,919,987 B2
(45) Date of Patent: Dec. 30, 2014

(54) LED DISPLAY UNIT WITH SOLAR PANELS AND LED DISPLAY DEVICE INCLUDING SAME

(71) Applicant: Chih-Chen Lai, New Taipei (TW)

(72) Inventor: Chih-Chen Lai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/684,566

(22) Filed: Nov. 25, 2012

(65) Prior Publication Data
US 2013/0272023 A1    Oct. 17, 2013

(30) Foreign Application Priority Data
Apr. 13, 2012   (TW) .............. 101113100 A

(51) Int. Cl.
| | | |
|---|---|---|
| *F21L 4/08* | (2006.01) | |
| *F21V 8/00* | (2006.01) | |
| *G09F 27/00* | (2006.01) | |
| *F21S 9/03* | (2006.01) | |
| *F21V 13/12* | (2006.01) | |

(52) U.S. Cl.
CPC ............ *G02B 6/0001* (2013.01); *G09F 27/007* (2013.01); *F21S 9/03* (2013.01); *F21V 13/12* (2013.01)
USPC ............... 362/183; 362/1; 362/23.1; 362/602

(58) Field of Classification Search
CPC ...... H01L 31/02322; F21S 9/03; F21S 9/032; G02B 6/0073; G09F 13/18; G09F 27/007; G09F 13/04; G09F 9/33; F21V 13/12
USPC ........... 362/1, 23.09, 23.1, 23.16, 23.17, 183, 362/602
See application file for complete search history.

(56) References Cited

U.S. PATENT DOCUMENTS

| | | | |
|---|---|---|---|
| 6,386,721 B1 * | 5/2002 | Hosseini et al. ............... | 362/602 |
| 7,789,524 B2 * | 9/2010 | Anderson ...................... | 362/183 |
| 2008/0130295 A1 * | 6/2008 | Ueda et al. .................... | 362/346 |
| 2011/0157879 A1 * | 6/2011 | Chang et al. ................... | 362/183 |
| 2013/0133736 A1 * | 5/2013 | Van Bommel et al. ........ | 136/256 |

FOREIGN PATENT DOCUMENTS

| | | | |
|---|---|---|---|
| KR | 2007100485 A | * | 10/2007 |
| WO | WO 2011114262 A2 | * | 9/2011 |

* cited by examiner

*Primary Examiner* — Y M Lee
(74) *Attorney, Agent, or Firm* — Novak Druce Connolly Bove + Quigg LLP

(57) ABSTRACT

An LED display unit includes a light guide, a diffusion layer, an LED module, and a solar panel. The light guide includes a first light incident surface and a light emitting surface connected to the first light incident surface. The diffusion layer includes a side surface and a second light incident surface connected to the side surface. The second light incident surface is adjacent to the light emitting surface. The LED module is adjacent to the first light incident surface. The solar panel is adjacent to the side surface and electrically connected with the LED module.

14 Claims, 5 Drawing Sheets

LED DISPLAY UNIT WITH SOLAR PANELS AND LED DISPLAY DEVICE INCLUDING SAME

BACKGROUND

1. Technical Field

The present disclosure relates to a light emitting diode (LED) display unit with solar panels and an LED display device including the LED display unit.

2. Description of Related Art

An LED display device is widely used as an outdoor advertising equipment. Yet, solar energy irradiating on the LED display device is not being used and opportunities are being wasted.

Therefore, it is desired to provide an LED display unit and an LED display device which can overcome the above-mentioned problem.

DETAILED DESCRIPTION

Figure 1:
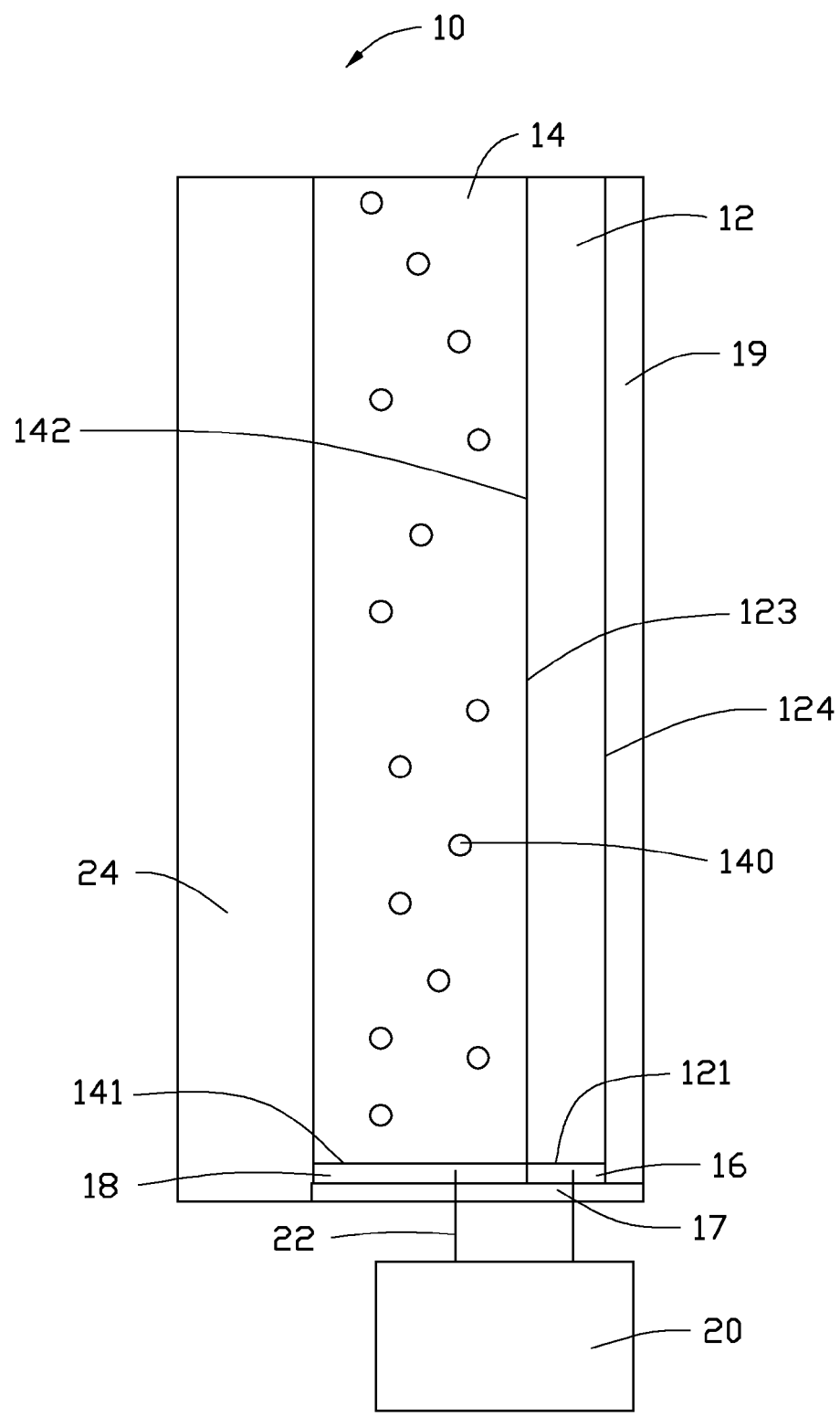
FIG. 1 is a schematic view of an LED display unit according to a first embodiment.

FIG. 1 shows an LED display unit 10 according to a first embodiment. The LED display unit 10 includes a reflective layer 19, a light guide 12, a diffusion layer 14, and a transparent protective layer 24 stacked in sequence. The reflective layer 19 is made of reflective material, such as aluminum. The light guide 12 is made of transparent material, such as polymethylmethacrylate (PMMA). The light guide 12 includes a first light incident surface 121, a light emitting surface 123 connected to the first light incident surface 121, and a bottom surface 124 opposite to the light emitting surface 123. The reflective layer 19 is attached to the bottom surface 124.

The diffusion layer 14 is made of transparent material, such as PMMA. Diffusion particles 140 are scattered in the diffusion layer 14. The diffusion layer 14 includes a first side surface 141 and a second light incident surface 142 connected to the first side surface 141. The second light incident surface 142 is adjacent to the light emitting surface 123 of the light guide 12.

The transparent protective layer 24 is made of glass or transparent resin material. The transparent protective layer 24 is used to protect the components of the LED display unit 10.

The LED display unit 10 further includes a first LED module 16 positioned on the first light incident surface 121, a first solar panel 18 positioned on the first side surface 141, a first substrate 17 carrying the first LED module 16 and the first solar panel 18, and a rechargeable battery 20. The rechargeable battery 20 is electrically connected to the first LED module 16 and the first solar panel 18 respectively by wires 22. The first solar panel 18 charges the rechargeable battery 20. The rechargeable battery 20 supplies power to the first LED module 16. In other embodiments, the solar panel 18 can be directly electrically connected to the LED module 16.

Figure 2:
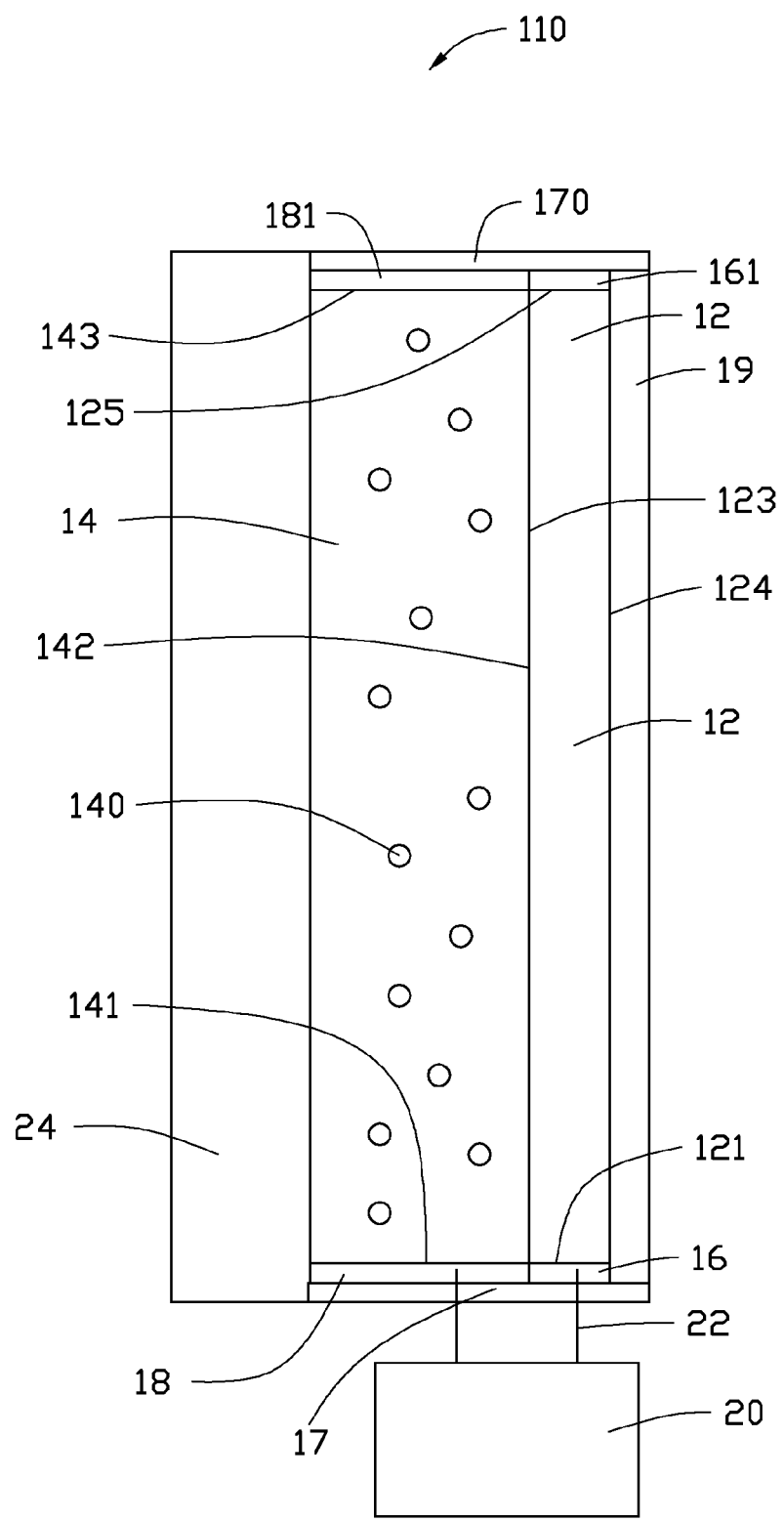
FIG. 2 is a schematic view of an LED display unit according to a second embodiment.

FIG. 2 shows an LED display unit 110 according to a second embodiment. The LED display unit 110 is similar to the LED display unit 10, except for the difference described below. The light guide 12 further includes a third light incident surface 125. The third light incident surface 125 is opposite to the first light incident surface 121. The LED display unit 110 further includes a second LED module 161. The second LED module 161 is positioned on the third light incident surface 125. The diffusion layer 14 further includes a second side surface 143 opposite to the first side surface 141. The LED display unit 110 further includes a second solar panel 181 and a second substrate 170. The second solar panel 181 is positioned on the second side surface 143. The second substrate 170 carries the second LED module 161 and the second solar panel 181. The second LED module 161 and the second solar panel 181 are electrically connected to the rechargeable battery 20 respectively.

Figure 3:
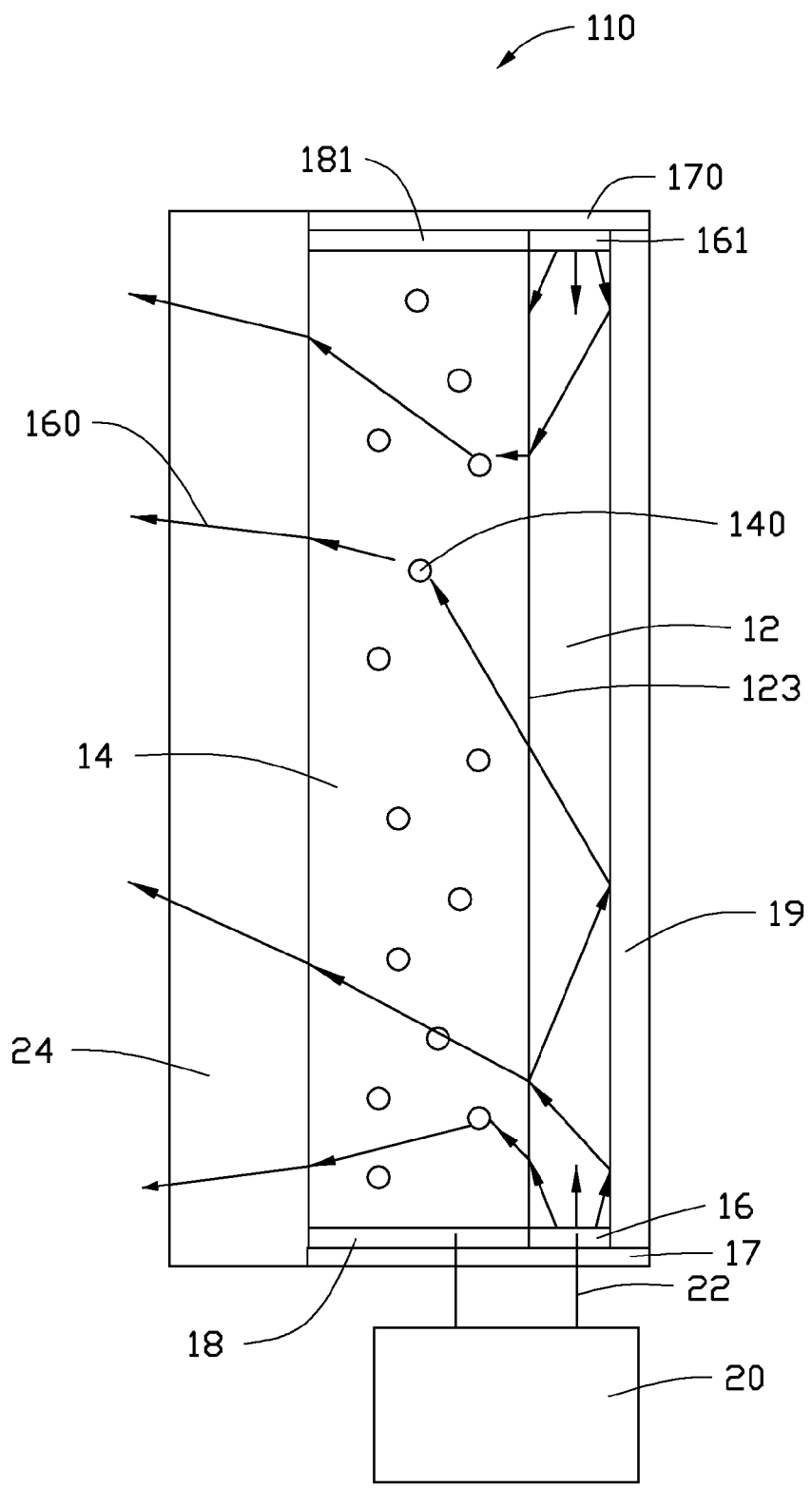
FIG. 3 is a schematic view, showing the LED display unit of FIG. 2 working in a display mode.

FIG. 3 shows when the LED display unit 110 is working in a display module, both of the first LED module 16 and the second LED module 161 emit light 160. The light 160 is transmitted into the light guide 12, the diffusion layer 14, and the transparent protective layer 24 in sequence, and finally emits out of the LED display unit 110 from the transparent protective layer 24. When the light 160 reaches the reflective layer 19, the reflective layer 19 reflects the light 160 back to the light guide 12, thus, no light leak will occur.

Figure 4:
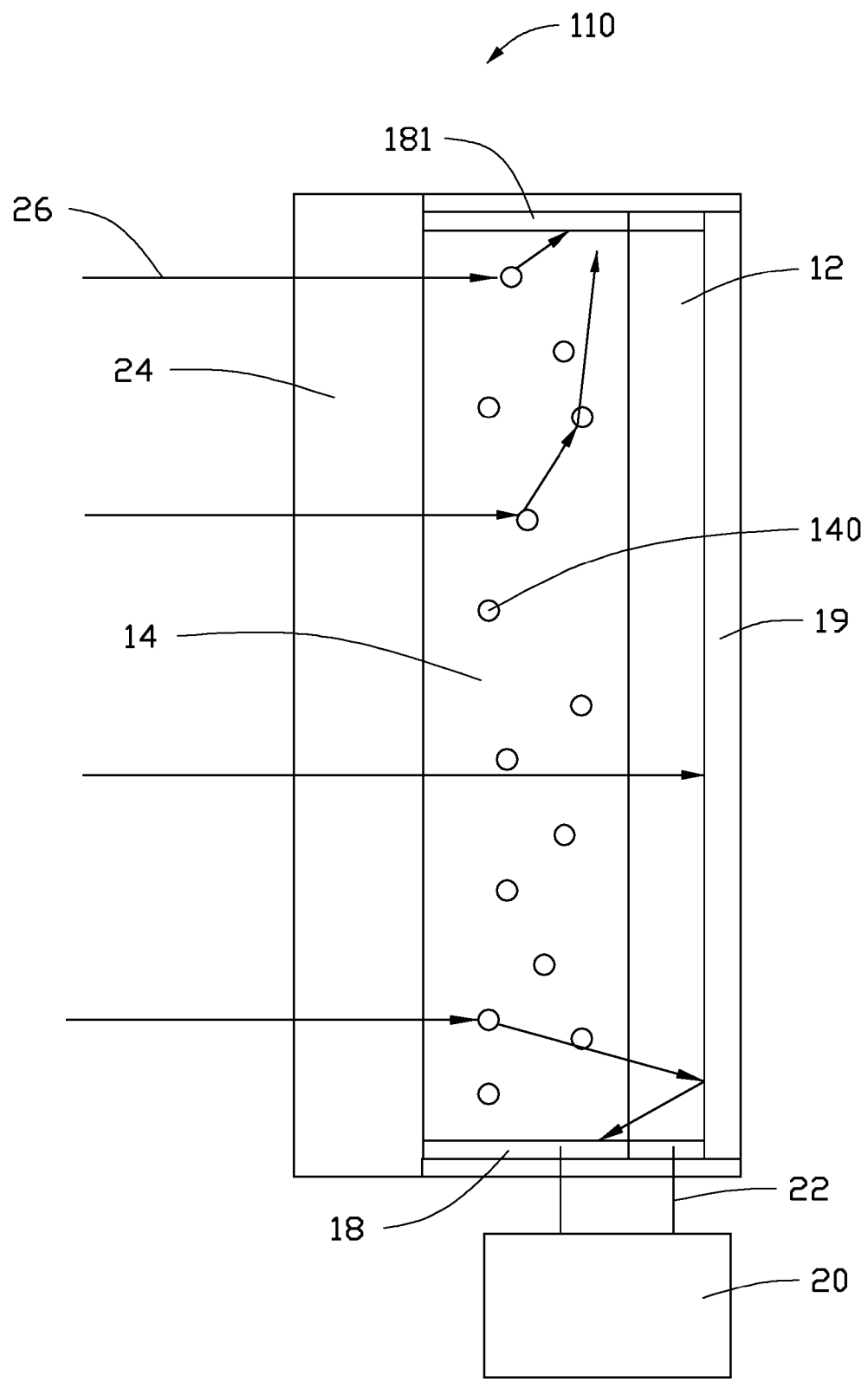
FIG. 4 is a schematic view, showing the LED display unit of FIG. 2 irradiated by sun light.

FIG. 4 shows the LED display unit 110, receiving sun light 26, which is transmitted through the transparent protective layer 24 to reach the diffusion layer 14. The diffusion particles 140 scatter the sun light 26. In this way, part of the sun light 26 reaches the first solar panel 18 and the second solar panel 181. The first solar panel 18 and the second solar panel 181 transfer the energy of the sun light 26 into electric energy and store the electric energy in the rechargeable battery 20. Part of the sun light 26 reaches the reflective layer 19 and is reflected back to the diffusion layer 14 by the reflective layer 19, and can finally reach the first solar panel 18 and/or the second solar panel 181.

Figure 5:
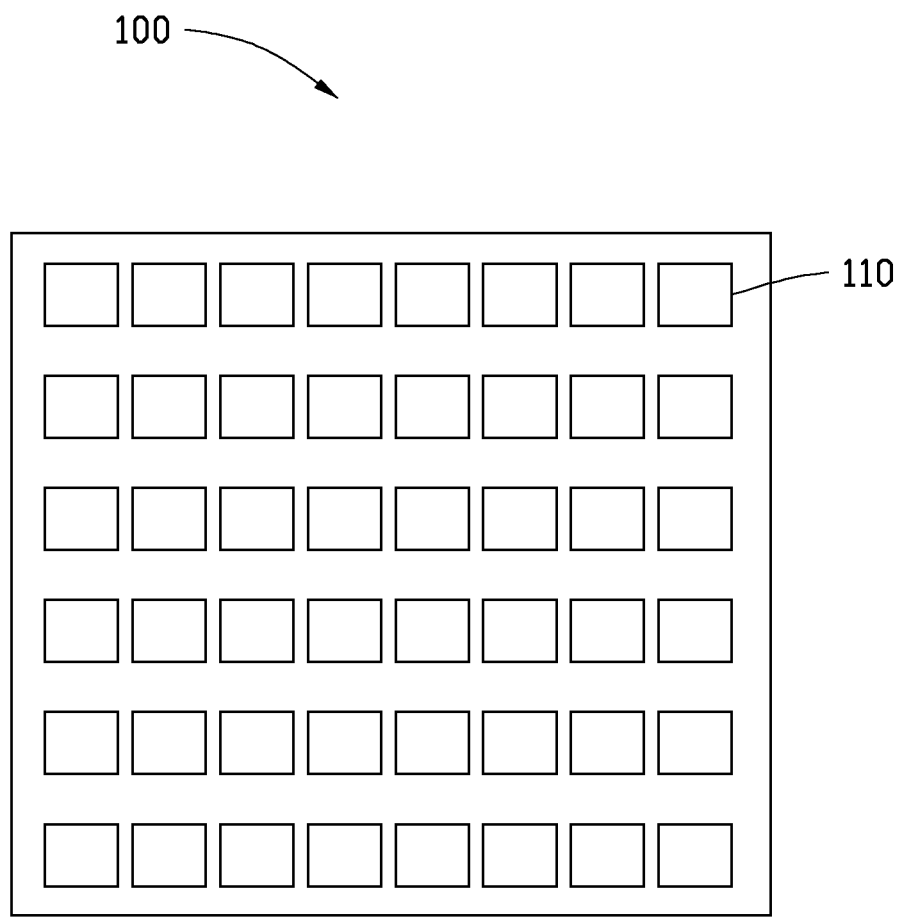
FIG. 5 is a schematic view of an LED display device according to a third embodiment.

FIG. 5 shows an LED display device 100 according to a third embodiment. The LED display device 100 includes an array of LED display units 110. Each LED display unit 110 serves as a pixel of the LED display device 100. The LED display device 100 can show an image in the display mode, and can transfer the energy of the sun light into electric energy when the sun light irradiates the LED display device 100. In this way, a power-saving LED display device 100 is achieved.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An LED display unit comprising:
   a light guide comprising a first light incident surface and a light emitting surface connected to the first light incident surface;
   a diffusion layer with integrated diffusion particles, the diffusion layer comprising a first side surface and a second light incident surface connected to the first side surface, the second light incident surface being adjacent to the light emitting surface;
   a first LED module adjacent to the first light incident surface; and a first solar panel positioned on the first side surface and electrically connected with the first LED module, wherein the first solar panel receives sunlight scattered by the diffusion particles.

2. The LED display unit of claim 1, further comprising a transparent protective layer positioned on the diffusion layer.

3. The LED display unit of claim 1, wherein the light guide further comprises a third light incident surface opposite to the first light incident surface, the LED display unit further comprises a second LED module adjacent to the third light incident surface.

4. The LED display unit of claim 1, wherein the diffusion layer further comprises a second side surface opposite to the first side surface, the LED display unit further comprises a second solar panel adjacent to the second side surface.

5. The LED display unit of claim 1, further comprising a rechargeable battery electrically connected to the first solar panel and the first LED module.

6. The LED display unit of claim 1, further comprising a substrate carrying the first solar panel and the first LED module.

7. The LED display unit of claim 1, wherein the light guide further comprises a bottom surface opposite to the light emitting surface, and the LED display unit further comprises a reflective layer adjacent to the bottom surface.

8. An LED display device comprising:
an array of LED display units, each of the LED display units comprising:
a light guide comprising a first light incident surface and a light emitting surface connected to the first light incident surface;
a diffusion layer with integrated diffusion particles, the diffusion layer comprising a first side surface and a second light incident surface connected to the first side surface, the second light incident surface being adjacent to the light emitting surface;
a first LED module adjacent to the first light incident surface; and
a first solar panel positioned on the first side surface and electrically connected with the LED module, wherein the first solar panel receives sunlight scattered by the diffusion particles.

9. The LED display device of claim 8, wherein each of the LED display units further comprises a transparent protective layer positioned on the diffusion layer.

10. The LED display device of claim 8, wherein the light guide further comprises a third light incident surface opposite to the first light incident surface, and each of the LED display units further comprises a second LED module adjacent to the third light incident surface.

11. The LED display device of claim 8, wherein the diffusion layer further comprises a second side surface opposite to the first side surface, and each of the LED display units further comprises a second solar panel adjacent to the second side surface.

12. The LED display unit of claim 8, wherein each of the LED display units further comprises a rechargeable battery electrically connected to the first solar panel and the first LED module.

13. The LED display device of claim 8, wherein each of the LED display units further comprises a substrate carrying the first solar panel and the first LED module.

14. The LED display device of claim 8, wherein the light guide further comprises a bottom surface opposite to the light emitting surface, and each of the LED display units further comprises a reflective layer adjacent to the bottom surface.

* * * * *